(No Model.)
R. B. MEANY.
MEANS FOR CLOSING GAS MAINS.
No. 587,102. Patented July 27, 1897.
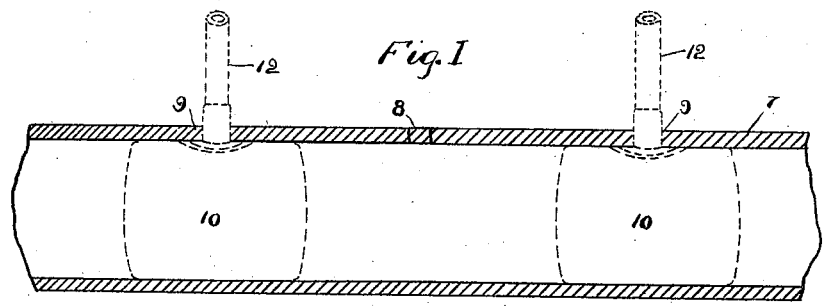
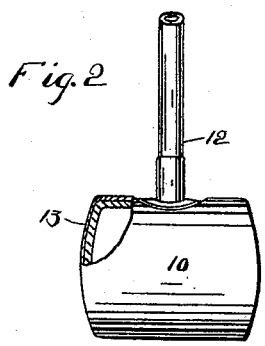
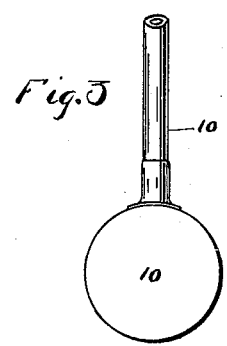
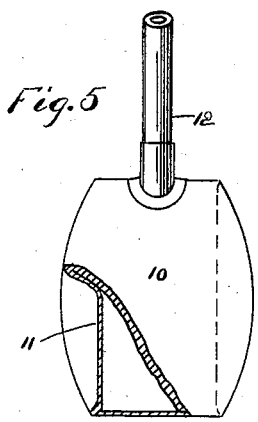
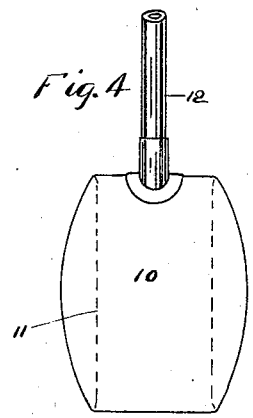
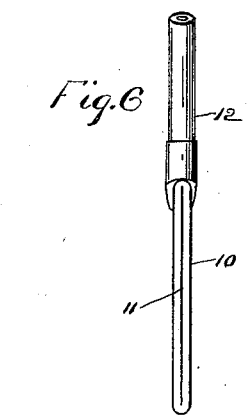
WITNESSES
INVENTOR
Richard B. Meany
BY
Edgar Tate & Co.
ATTORNEYS

UNITED STATES PATENT OFFICE.

RICHARD BERNARD MEANY, OF UNION, HUDSON COUNTY, NEW JERSEY.

MEANS FOR CLOSING GAS-MAINS.

SPECIFICATION forming part of Letters Patent No. 587,102, dated July 27, 1897.

Application filed January 23, 1897. Serial No. 620,406. (No model.)

*To all whom it may concern:*

Be it known that I, RICHARD BERNARD MEANY, a citizen of the United States, residing at town of Union, in the county of Hudson and State of New Jersey, have invented certain new and useful Improvements in Means for Closing Gas-Mains, of which the following is a full and complete specification, such as will enable those skilled in the art to which it appertains to make and use the same.

This invention relates to means for closing a gas-main in the operation of connecting a branch pipe therewith; and the object of the invention is to provide an improved device of this class which is simple in construction and operation and which is designed to securely close the main, so that the gas cannot pass therethrough.

In the practice of my invention I provide a flexible cylindrical device which is preferably composed of rubber, rubber and canvas, or other similar material and which is oblong in form and provided centrally, at one side thereof, with a flexible tube, through which it may be inflated, and which, when fully inflated, is cylindrical in form and adapted to closely fit and close the gas-main, but when not in use may be folded together, so as to be inserted through a small opening in said main.

The invention is fully disclosed in the following specification, of which the accompanying drawings form a part, in which—

Figure 1 is a longitudinal central section of a gas-main, showing the application of my improvement; Fig. 2, a side view of the device which I employ, said device being inflated; Fig. 3, an end view thereof; Fig. 4, a side view showing the device collapsed; Fig. 5, a similar view partly in section, and Fig. 6 an end view thereof.

In the drawings forming part of this specification the separate parts of my improvement are designated by the same numerals of reference in each of the views, and in said drawings I have shown at 7 a section of a gas-main, and in the practice of my invention and when it is desired to connect a branch pipe with said main at any particular point, for instance at 8, I form on the opposite sides of said point openings 9 and I also provide a flexible hollow cylindrical stopper 10, which, when inflated, is cylindrical in form, but which may be collapsed, as shown in Figs. 4, 5, and 6, in which position the ends thereof are folded inwardly, as shown at 11. To one side of this device is secured a flexible tube 12, this connection being made in any desired manner, and in practice the hollow tubular flexible casing 10 is folded compactly and inserted through the openings 9 and then inflated to the fullest extent, and in this position they extend longitudinally in the main 7 and securely close the same and prevent the circulation of the gas therein. When the main has thus been closed, the connection at 8 may be made in the usual manner, as will be readily understood, and in practice I provide a flexible covering 13, which is shown in Fig. 2 and which is provided with an opening in one side thereof, through which the flexible hollow packing device 10 may be inserted, and said covering is intended to protect said device from acids and other substances in the gas-main, by which the material of which the packing device is composed would otherwise be injured or destroyed. This covering is intended to prolong the life and use of the packing device and may or may not be employed.

I am aware that hollow flexible packing devices have heretofore been used in a manner similar to that herein described, but these devices were spherical in form and afforded only a small point of contact with the gas-main, but my improvement being cylindrical in form when inflated and of any desired length it will be apparent that this point of contact with the main will be of equal length with the packing device, and when said packing device is fully inflated the main will be entirely closed and the gas cannot circulate therein.

Having fully described my invention, I claim as new and desire to secure by Letters Patent—

1. The herein-described packing device for gas-mains, the same being hollow and flexible, and being cylindrical in form when inflated, said device being provided at one side thereof with a flexible tube, substantially as shown and described.

2. The herein-described packing device for gas-mains, the same being hollow and flexible, and being cylindrical in form when inflated, said device being provided at one side thereof with a flexible tube, and also with a flexible covering, substantially as shown and described.

In testimony that I claim the foregoing as my invention I have signed my name, in presence of the subscribing witnesses, this 19th day of January, 1897.

RICHARD BERNARD MEANY.

Witnesses:
GEORGE LIMOUZE,
C. GERST.